United States Patent
Jung et al.

(10) Patent No.: US 11,601,016 B2
(45) Date of Patent: Mar. 7, 2023

(54) ELECTRONIC DEVICE FOR PROVIDING WIRELESS CHARGING FUNCTION AND OPERATION METHOD THEREOF

(71) Applicant: Samsung Electronics Co., Ltd., Suwon-si (KR)

(72) Inventors: Kisung Jung, Suwon-si (KR); Myoungjun Choi, Suwon-si (KR); Duckwon Yoon, Suwon-si (KR); Byongjeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 17/016,899

(22) Filed: Sep. 10, 2020

(65) Prior Publication Data
US 2021/0075259 A1    Mar. 11, 2021

(30) Foreign Application Priority Data
Sep. 10, 2019  (KR) .......................... 10-2019-0112264

(51) Int. Cl.
*G06F 3/044*      (2006.01)
*H02J 50/10*      (2016.01)
(Continued)

(52) U.S. Cl.
CPC ............ *H02J 50/10* (2016.02); *G06F 3/0416* (2013.01); *G06F 3/0445* (2019.05);
(Continued)

(58) Field of Classification Search
CPC ....... H02J 50/10; H02J 7/0047; G06F 3/0445; G06F 3/0416; G06F 3/0446
See application file for complete search history.

(56) References Cited

U.S. PATENT DOCUMENTS 9,501,168 B2   11/2016  Peterson et al.
9,997,949 B2    6/2018  Chen
(Continued)

FOREIGN PATENT DOCUMENTS

KR   10-2018-0042919 A    4/2018
WO     2015/020683 A1     2/2015

OTHER PUBLICATIONS

International Search Report dated Dec. 31, 2020, issued in International Application No. PCT/KR2020/012233.
(Continued)

*Primary Examiner* — Robert J Michaud
(74) *Attorney, Agent, or Firm* — Jefferson IP Law, LLP

(57) ABSTRACT

An electronic device for providing a wireless charging function and a method thereof is provided. The electronic device includes a housing, a touch pad which is disposed in the housing and includes an electrode pattern and multiple openings formed on the electrode pattern, a wireless charging coil, and a processor operationally connected to the touch pad and the wireless charging coil, wherein the processor is configured to perform a touch detection function of detecting a touch by an inputting subject by using at least one electrode pattern of the touch pad, calculate a capacitance variation of the touch pad while the touch detection function is performed, determine whether the inputting subject requires a charging function, based on the calculated capacitance variation, and, in response to determining that the inputting subject requires the charging function, perform a charging function of transmitting power by using the wireless charging coil.

20 Claims, 17 Drawing Sheets

(51) Int. Cl.
*H02J 7/02* (2016.01)
*H02J 7/00* (2006.01)
*G06F 3/041* (2006.01)

(52) U.S. Cl.
CPC .............. *H02J 7/0047* (2013.01); *H02J 7/02* (2013.01); *G06F 3/0446* (2019.05)

(56) References Cited

U.S. PATENT DOCUMENTS

| | | | |
|---|---|---|---|
| 2009/0134713 A1* | 5/2009 | Stevens | H02J 50/12 307/104 |
| 2013/0162202 A1 | 6/2013 | Wang | |
| 2013/0175986 A1 | 7/2013 | Senatori | |
| 2014/0197782 A1 | 7/2014 | Graf et al. | |
| 2014/0354223 A1 | 12/2014 | Lee et al. | |
| 2016/0261137 A1 | 9/2016 | Riehl | |
| 2017/0063145 A1 | 3/2017 | Von Novak, III et al. | |
| 2018/0109132 A1 | 4/2018 | Cho et al. | |
| 2020/0343314 A1* | 10/2020 | Nakamura | H01L 27/3276 |

OTHER PUBLICATIONS

Extended European Search Report dated Jul. 21, 2022, issued in a counterpart European Application No. 20862290.2.

\* cited by examiner

|     | X8  | X9  | X10 | X11  | X12 | X13 | X14 | X15 | X16 | X17 | X18 |
| --- | --- | --- | --- | ---- | --- | --- | --- | --- | --- | --- | --- |
| Y0  | 46  | 28  | -45 | -115 | -29 | -3  | -3  | 14  | -49 | 103 | 17  |
| Y1  | -51 | -66 | -3  | -13  | -51 | -79 | -16 | -28 | -5  | -22 | -72 |
| Y2  | -36 | -37 | -18 | -24  | -35 | -82 | -40 | -50 | -4  | 1   | -48 |
| Y3  | -72 | -67 | -17 | 1    | -31 | -85 | -16 | -34 | 7   | -44 | -65 |
| Y4  | -75 | -60 | -31 | 3    | -26 | -98 | -35 | -48 | 21  | -40 | -43 |
| Y5  | -25 | -21 | -35 | -53  | -11 | -27 | 25  | 8   | -23 | 6   | -1  |
| Y6  | -62 | -30 | -36 | -10  | 28  | -21 | -8  | -35 | 16  | -38 | -39 |
| Y7  | 118 | 167 | -22 | -16  | 593 | 554 | 166 | 103 | -31 | 43  | 54  |
| Y8  | 220 | 263 | 2   | 347  | 1392| 1716| 639 | 242 | -44 | 160 | 214 |
| Y9  | 114 | 174 | 51  | 751  | 1326| 1560| 831 | 23  | 35  | 103 | 107 |
| Y10 | 158 | 217 | 95  | 725  | 1245| 1743| 1128| 247 | 11  | 128 | 193 |
| Y11 | 170 | 203 | 41  | 410  | 1342| 1789| 701 | 293 | -25 | 161 | 237 |
| Y12 | 35  | 8   | 5   | 0    | 371 | 585 | 202 | 149 | -13 | 54  | 101 |
| Y13 | -12 | -8  | -16 | -6   | 14  | -9  | -22 | -9  | 21  | 18  | 19  |
| Y14 | -7  | -1  | -8  | 8    | -5  | 25  | 38  | 34  | 14  | -4  | 27  |
| Y15 | 71  | 2   | 2   | -40  | 14  | 77  | 70  | 79  | -7  | 74  | 106 |
| Y16 | -1  | 5   | 2   | 44   | -6  | 7   | 29  | 28  | 34  | -38 | 3   |
| Y17 | 122 | 14  | 20  | -12  | 59  | 91  | 93  | 102 | 1   | 62  | 101 |
| Y18 | 199 | 18  | 16  | -41  | 152 | 159 | -145| -4  | 7   | 117 | 145 |

FIG.10A

|     | X11  | X12 | X13  | X14  | X15   | X16   | X17   | X18  | X19  | X20   | X21  | X22  | X23   | X24   |
| --- | ---- | --- | ---- | ---- | ----- | ----- | ----- | ---- | ---- | ----- | ---- | ---- | ----- | ----- |
| Y0  | -179 | 142 | -601 | -793 | -1274 | -1755 | -2812 | -768 | -260 | -1061 | -783 | -535 | -1198 | -971  |
| Y1  | -3   | -24 | -565 | -756 | -1423 | -1815 | -2845 | -777 | -269 | -1188 | -822 | -601 | -1310 | -1086 |
| Y2  | -7   | 16  | -549 | -736 | -1399 | -1792 | -2841 | -787 | -272 | -1188 | -842 | -622 | -1303 | -1081 |
| Y3  | 18   | -25 | -519 | -696 | -1364 | -1627 | -2680 | -741 | -245 | -1130 | -786 | -616 | -1290 | -1078 |
| Y4  | 30   | -23 | -405 | -376 | -635  | -459  | -925  | -538 | -719 | -817  | -633 | -632 | -1151 | -963  |
| Y5  | -18  | 27  | 394  | 364  | 142   | 216   | 67    | 196  | 446  | 375   | -139 | -501 | -563  | -54   |
| Y6  | 30   | -32 | 293  | 199  | 97    | 417   | 210   | 382  | 1007 | 1171  | 887  | 136  | 216   | 317   |
| Y7  | -29  | 33  | 266  | 208  | 180   | 538   | 356   | 438  | 1113 | 1320  | 1169 | 519  | 487   | 426   |
| Y8  | -56  | 62  | 261  | 183  | 197   | 595   | 422   | 479  | 1189 | 1408  | 1312 | 710  | 566   | 453   |
| Y9  | 36   | -8  | 98   | 149  | 125   | 506   | 179   | 312  | 1134 | 1122  | 1051 | 555  | 388   | 303   |
| Y10 | 14   | -29 | 99   | 67   | 33    | 573   | 407   | 355  | 1188 | 1223  | 1250 | 562  | 428   | 263   |
| Y11 | -27  | 9   | 223  | 117  | 81    | 572   | 441   | 366  | 1017 | 1056  | 1320 | 606  | 449   | 281   |
| Y12 | -6   | -4  | 201  | 102  | 44    | 540   | 261   | 23   | 236  | 635   | 1220 | 551  | 443   | 317   |
| Y13 | 22   | 4   | 165  | 132  | 52    | 395   | -28   | -195 | -118 | 163   | 689  | 512  | 331   | 309   |
| Y14 | 28   | -22 | 167  | 100  | 23    | 474   | 181   | 55   | -59  | 81    | 325  | 418  | 368   | 302   |
| Y15 | -39  | 69  | 22   | 114  | 192   | 447   | 210   | 273  | 310  | 49    | 131  | 488  | 407   | 409   |
| Y16 | 51   | -53 | 114  | 144  | 37    | 427   | 172   | 361  | 442  | -43   | -36  | 385  | 312   | 290   |
| Y17 | -21  | 304 | 283  | 278  | 244   | 481   | 239   | 532  | 370  | 53    | -53  | 337  | 428   | 373   |
| Y18 | -73  | 126 | 182  | -5   | -2    | 185   | 150   | 344  | 3    | -2    | 40   | 384  | 357   | 252   |

FIG. 10B

| | X13 | X14 | X15 | X16 | X17 | X18 | X19 | X20 | X21 | X22 | X23 | X24 | X25 | X26 | X27 | X28 |
|---|---|---|---|---|---|---|---|---|---|---|---|---|---|---|---|---|
| Y0 | 71 | 32 | 126 | 11 | 9 | 12 | 24 | 141 | 184 | 149 | 75 | 24 | 83 | 13 | 45 | 6 |
| Y1 | 27 | 30 | 39 | 16 | 25 | 13 | 2 | 0 | 44 | 9 | 0 | 2 | 0 | 8 | 6 | 2 |
| Y2 | 45 | 36 | 37 | 7 | 16 | 17 | 8 | 5 | 2 | 4 | 2 | 0 | 2 | 6 | 2 | 3 |
| Y3 | 12 | 25 | 10 | 17 | 19 | 4 | 8 | 5 | 4 | 4 | 4 | 4 | 2 | 0 | 0 | 1 |
| Y4 | 4 | 28 | 5 | 17 | 15 | 11 | 20 | 9 | 3 | 0 | 2 | 2 | 3 | 3 | 4 | 2 |
| Y5 | 39 | 35 | 53 | 112 | 35 | 22 | 19 | 25 | 46 | 11 | 28 | 5 | 16 | 10 | 0 | 1 |
| Y6 | 0 | 18 | 2 | 69 | 46 | 81 | 28 | 35 | 30 | 4 | 2 | 1 | 5 | 3 | 6 | 1 |
| Y7 | 33 | 24 | 56 | 88 | 93 | 213 | 202 | 111 | 90 | 8 | 40 | 18 | 35 | 24 | 11 | 1 |
| Y8 | 48 | 27 | 78 | 72 | 76 | 234 | 222 | 101 | 109 | 36 | 78 | 49 | 81 | 61 | 26 | 1 |
| Y9 | 0 | 0 | 1 | 0 | 5 | 65 | 126 | 45 | 9 | 3 | 10 | 1 | 7 | 12 | 12 | 2 |
| Y10 | 6 | 7 | 0 | 45 | 22 | 154 | 182 | 62 | 50 | 9 | 0 | 19 | 15 | 43 | 4 | 4 |
| Y11 | 13 | 10 | 42 | 85 | 78 | 233 | 217 | 89 | 62 | 10 | 66 | 58 | 82 | 82 | 34 | 10 |
| Y12 | 2 | 11 | 17 | 102 | 94 | 241 | 218 | 95 | 67 | 13 | 29 | 37 | 43 | 53 | 26 | 4 |
| Y13 | 2 | 3 | 1 | 74 | 69 | 154 | 168 | 94 | 42 | 6 | 14 | 0 | 17 | 0 | 3 | 0 |
| Y14 | 9 | 3 | 1 | 75 | 58 | 135 | 199 | 127 | 93 | 30 | 7 | 17 | 27 | 17 | 8 | 0 |
| Y15 | 30 | 14 | 47 | 101 | 54 | 169 | 227 | 163 | 116 | 82 | 101 | 76 | 121 | 57 | 49 | 60 |
| Y16 | 19 | 13 | 9 | 76 | 52 | 131 | 205 | 87 | 39 | 11 | 5 | 24 | 26 | 27 | 11 | 48 |
| Y17 | 6 | 1 | 23 | 134 | 80 | 196 | 252 | 171 | 135 | 84 | 101 | 83 | 146 | 77 | 60 | 55 |
| Y18 | 7 | 24 | 14 | 79 | 33 | 166 | 247 | 173 | 135 | 111 | 146 | 111 | 206 | 102 | 80 | 59 |

|     | X12 | X13 | X14  | X15 | X16 | X17  | X18  | X19 | X20 | X21  | X22 |
|-----|-----|-----|------|-----|-----|------|------|-----|-----|------|-----|
| Y9  | -82 | -81 | -156 | -19 | -82 | -103 | -110 | -22 | 20  | -112 | -28 |
| Y10 | 26  | -16 | -27  | -21 | -9  | -24  | -14  | 9   | 40  | 54   | 30  |
| Y11 | 50  | 57  | 46   | -15 | 24  | 60   | 87   | 48  | 23  | 110  | 59  |
| Y12 | 40  | 22  | 81   | 47  | 84  | 74   | 110  | 53  | 33  | 62   | 50  |
| Y13 | -58 | 40  | 60   | 66  | 60  | -23  | 45   | 22  | 84  | 26   | 45  |
| Y14 | 36  | 97  | 151  | 185 | 174 | 164  | 141  | 112 | 151 | 199  | 139 |
| Y15 | 91  | 160 | 231  | 245 | 240 | 210  | 240  | 166 | 217 | 205  | 121 |
| Y16 | 74  | 127 | 150  | 158 | 163 | 129  | 148  | 98  | 147 | 160  | 114 |
| Y17 | 149 | 199 | 252  | 278 | 261 | 238  | 263  | 203 | 253 | 239  | 141 |
| Y18 | 202 | 257 | 92   | 202 | 296 | 296  | 341  | 269 | 312 | 317  | 149 |

ELECTRONIC DEVICE FOR PROVIDING WIRELESS CHARGING FUNCTION AND OPERATION METHOD THEREOF

CROSS-REFERENCE TO RELATED APPLICATION(S)

This application is based on and claims priority under 35 U.S.C. § 119(a) of a Korean patent application number 10-2019-0112264, filed on Sep. 10, 2019, in the Korean Intellectual Property Office, the disclosure of which is incorporated by reference herein in its entirety.

BACKGROUND

1. Field

The disclosure relates to an electronic device for providing a wireless charging function and a method thereof.

2. Description of Related Art

Electronic devices (e.g., mobile terminals, smart phones, or wearable devices) may provide various functions. For example, an electronic device may provide not only a basic sound communication function but also a short-range wireless communication function, a mobile communication ($3^{rd}$ generation (3G), $4^{th}$ generation (4G), or $5^{th}$ generation (5G)) function, a music reproduction function, a video reproduction, an image capturing function, a navigation function, or a wireless charging function.

An electronic device may charge a battery by using a wireless charging function without using a separate charging cable. For example, an electronic device may charge a battery thereof by using electromagnetic induction or electromagnetic resonance generated between a wireless power transmitting unit (e.g., a wireless power transmission coil) and a wireless power receiving unit (e.g., a wireless power receiving coil).

In addition, an electronic device may provide a battery sharing function of wirelessly sharing charging power with another electronic device by using a wireless charging function. For example, an electronic device for providing a battery sharing function may include a wireless power transmitting unit. The wireless power transmitting unit may identify a wireless power receiving unit by periodically transmitting a designated signal (e.g., a ping signal).

The above information is presented as background information only to assist with an understanding of the disclosure. No determination has been made, and no assertion is made, as to whether any of the above might be applicable as prior art with regard to the disclosure.

SUMMARY

A battery sharing function of an electronic device is performed or stopped based on input of a control key (e.g., one of multiple keys arranged in the electronic device). This reduces satisfaction of a user who wants to use the battery sharing function of the electronic device.

Further, the battery sharing function of the electronic device is provided while a wireless power transmitting unit remains active, regardless of input of the control key. However, in this case, the wireless power transmitting unit periodically transmits a designated signal (e.g., a ping signal) in order to identify a wireless power receiving unit and thus causes unnecessary battery consumption.

Aspects of the disclosure are to address at least the above-mentioned problems and/or disadvantages and to provide at least the advantages described below. Accordingly, an aspect of the disclosure is to provide an electronic device and a method thereof, wherein the electronic device determines a subject which has performed touch input, based on a capacitance variation, and activates a wireless charging function when the subject is determined to be a subject requiring a charging function, thereby increasing satisfaction of a user, who wants to use a battery sharing function, while preventing unnecessary battery consumption.

Additional aspects will be set forth in part in the description which follows and, in part, will be apparent from the description, or may be learned by practice of the presented embodiments.

In accordance with an aspect of the disclosure, an electronic device for supporting a wireless charging function is provided. The electronic device includes a housing, a touch pad which is disposed in the housing and includes an electrode pattern and multiple openings formed on the electrode pattern, a wireless charging coil disposed below the touch pad and configured to wirelessly transmit power through the multiple openings, and a processor operationally connected to the touch pad and the wireless charging coil, wherein the processor is configured to perform a touch detection function of detection a touch by an inputting subject by using at least one electrode pattern of the touch pad, calculate a capacitance variation of the touch pad while the touch detection function is performed, determine whether the inputting subject requires a charging function, based on the calculated capacitance variation, and in response to determining that the inputting subject requires the charging function, perform a charging function of transmitting power by using the wireless charging coil.

In accordance with another aspect of the disclosure, a method of an electronic device is provided. The method includes a wireless charging coil and a touch pad including an electrode pattern and multiple openings formed on the electrode pattern, includes performing a touch detection function of detecting a touch by an inputting subject by using at least one electrode pattern of the touch pad, calculating a capacitance variation of the touch pad while the touch detection function is performed, determining whether the inputting subject requires a charging function, based on the calculated capacitance variation, and, in response to determining that the inputting subject requires the charging function, performing a charging function of wirelessly transmitting power through the multiple openings by using the wireless charging coil.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10A illustrates a measurement value related to a capacitance characteristic of a touch pad for touch inputting subjects according to an embodiment of the disclosure;

FIG. 10B illustrates a measurement value related to a capacitance characteristic of a touch pad for touch inputting subjects according to an embodiment of the disclosure;

FIG. 10C illustrates a measurement value related to a capacitance characteristic of a touch pad for touch inputting subjects according to an embodiment of the disclosure;

FIG. 10D illustrates a measurement value related to a capacitance characteristic of a touch pad for touch inputting subjects according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
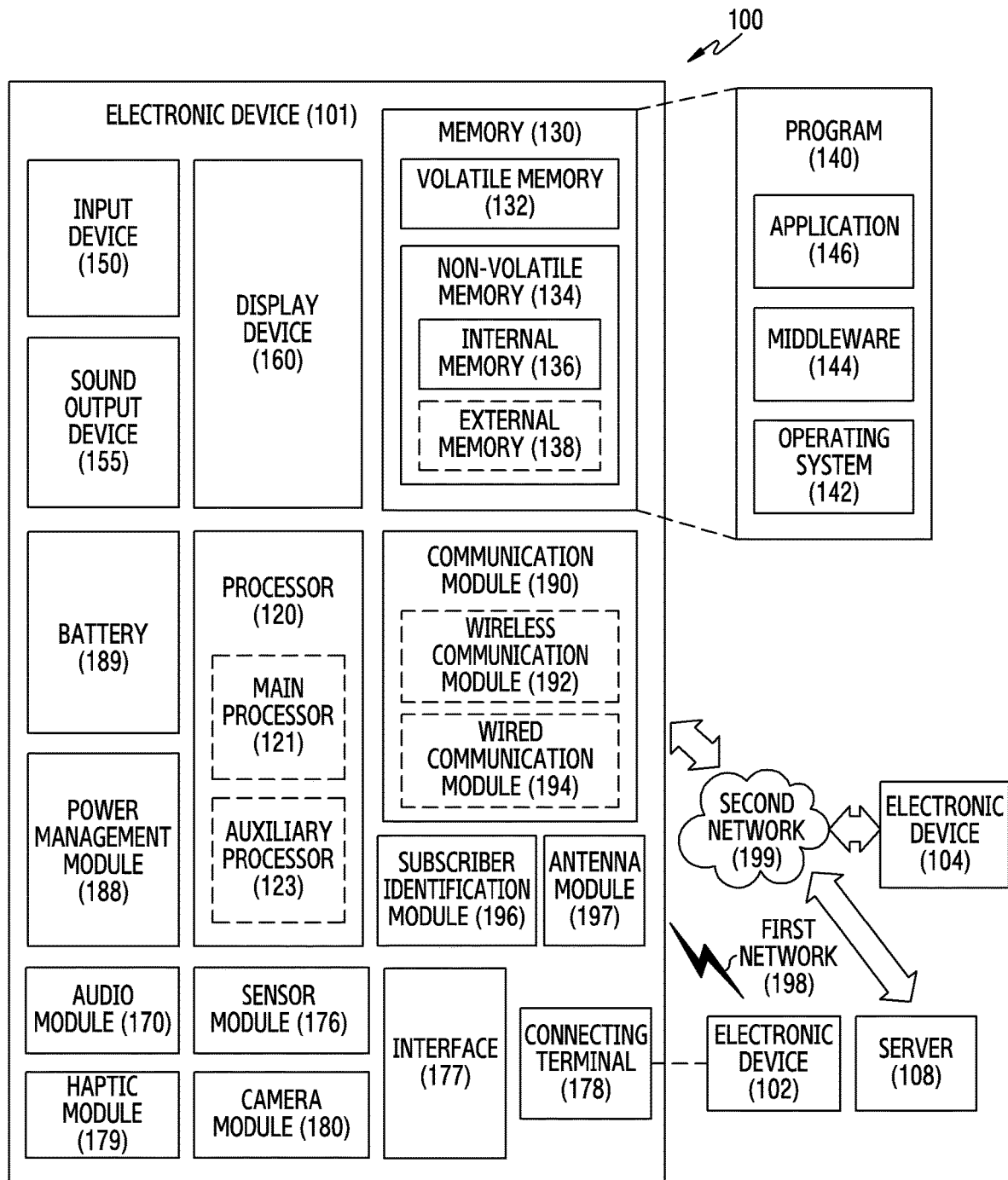
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
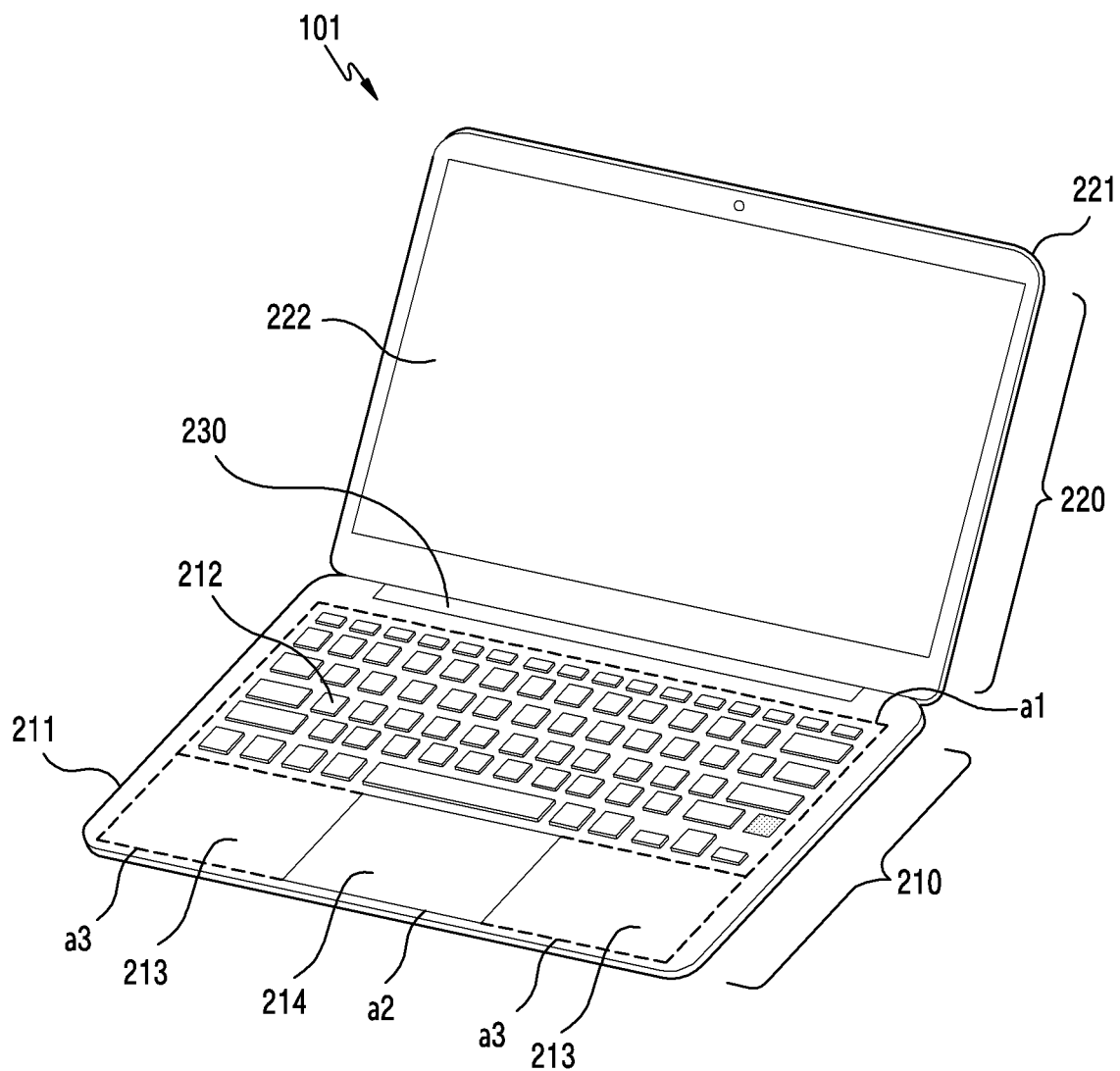
FIG. 2 is a perspective view illustrating an unfolded state of an electronic device provided with a touch pad according to an embodiment of the disclosure.

FIG. 2 is a perspective view illustrating an unfolded state of an electronic device provided with a touch pad according to an embodiment of the disclosure.

Referring to FIG. 2, the electronic device 101 according to various embodiments may include a first electronic device 210, a second electronic device 220, and a connection part 230 connecting the first electronic device 210 to the second electronic device 220. The connection part 230 may mechanically or electrically connect the first electronic device 210 to the second electronic device 220. When the first electronic device 210 is mechanically connected to the second electronic device 220, a hinge may be provided as a rotation shaft, and a folding unit may be provided in order to fold or unfold the first electronic device 210 and the second electronic device 220. The electronic device 101 may have a structure in which at least one of the first electronic device 210 and the second electronic device 220 is attached to and/or detached from the connection part 230. A flexible printed circuit board (FPCB) may be adopted in order to electrically connect the first electronic device 210 to the second electronic device 220.

The first electronic device 210 according to various embodiments may include a first housing 211 configured to protect various types of electronic components and form the exterior of the first electronic device 210. The first housing 211 according to various embodiments may include: a first surface facing in a first direction, and a second surface facing in a second direction opposite to the first direction. The first surface may be the inner surface of the electronic device 101, and the second surface may be the outer surface of the electronic device 101. Further, the first surface may be the top surface (or front surface) of the first electronic device 210, and the second surface may be the rear surface of the first electronic device 210.

In the first housing 211 according to various embodiments of the disclosure, multiple keys 212, a touch pad 214, and a palm rest 213 may be disposed on the first surface. The multiple keys 212 are disposed on the first surface of the first housing 211, and thus may be called a data input unit, a keyboard, or a keyboard housing. The multiple keys 212 may be disposed in a QWERY key arrangement. A reason in which the multiple keys 212 disposed at the first housing 211 may be called a keyboard area.

The first surface of the first housing 211 may include: a first area a1 in which the multiple keys 212 are disposed, a second area a2 in which the touch pad 214 is disposed, and a third area a3 in which the palm rest 213 is disposed. The first area a1, the second area a2, and the third area a3 may be disposed parallel to each other side by side without overlapping each other. The third area a3 may be formed at each of the left and right sides of the second area a2. For example, the third area a3 may be made of a metal material. However, this is only an example, and an embodiment is not limited thereto. For example, the third area a3 may be made of a material different from a metal material, or may be made of a combination of a metal material and a material different from the metal material.

According to various embodiments of the disclosure, as described later with reference to FIG. 3, the position of the touch pad 214 may correspond to a position in which a wireless charging unit (e.g., a wireless power transmitting coil) is disposed. For example, the touch pad 214 may be disposed above the wireless charging unit. Further, as described later with reference to FIGS. 4A, 4B, 5A, 5B, and 5C, the touch pad 214 may include at least one opening such that a path for transmitting charging power generated by the wireless charging unit is formed.

The second electronic device 220 according to various embodiments may include a second housing 221 which protects various electronic components and forms the exterior of the second electronic device 220. The second housing 221 according to various embodiments may include: a first surface facing in a first direction, and a second surface facing in a second direction opposite to the first direction. The first surface may be the inner surface of the electronic device 101, and the second surface may be the outer surface of the electronic device 101. Further, the first surface may be the top surface (or the front surface) of the second electronic device 220, and the second surface may be the rear surface of the second electronic device 220.

A display 222 may be disposed on the first surface of the second housing 221. The display 222 may be provided with a touch-sensitive panel and thus may operate as a touch screen. The second electronic device 220 includes the display 222 and thus may be called a display device.

The above-described structure of the electronic device 101 is only an example, and thus an embodiment is not limited thereto. For example, at least one of the above-described elements of the electronic device 101 may be omitted, or another element may be added. For example, an air vent may be formed through the side surface of the electronic device 101 such that air, externally introduced and circulated in the electronic device 101, is discharged through the air vent and thus heat generated in the electronic device 101 is removed.

Hereinafter, the structure of the touch pad 214 mounted in the second a2 of the first electronic device 210 will be described with reference to accompanying drawings.

Figure 3:
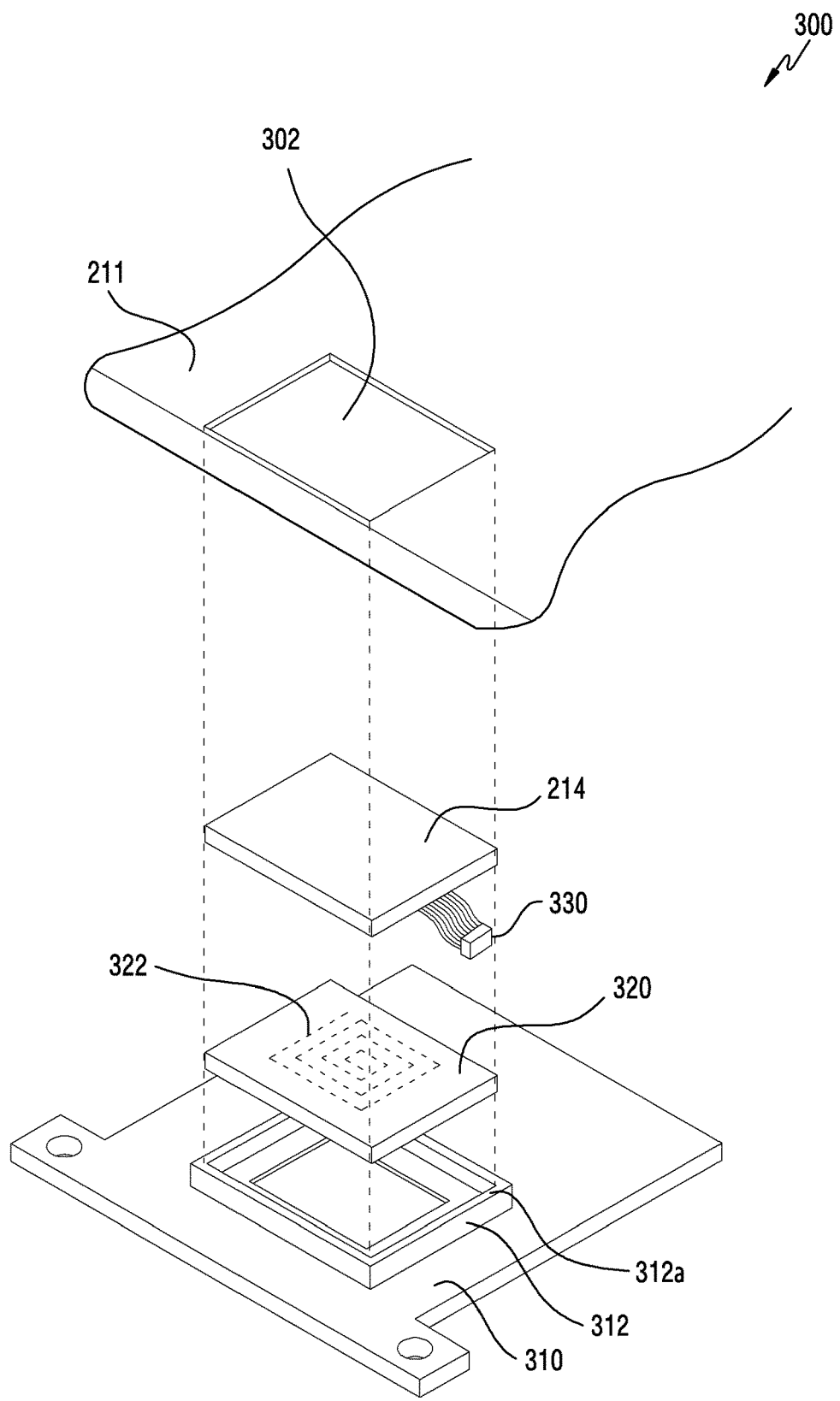
FIG. 3 is an exploded perspective view of a touch pad device according to an embodiment of the disclosure.

FIG. 3 is an exploded perspective view 300 of a touch pad device according to an embodiment of the disclosure.

Referring to FIG. 3, the touch pad device may further include: the touch pad 214 touched by a hand of a user, and a support member 310 configured to support or fix the touch pad 214.

According to various embodiments of the disclosure, when the touch pad 214 is touched by an inputting subject (e.g., a part of the human body, an electronic pen, etc.), a designated signal may be detected, and a position at which a user wants to point may be inputted according thereto. For example, the touch pad 214 may process information on coordinates (e.g., an X-axis coordinate and/or Y-axis coordinate) of a touched point thereon. Further, a connection member 330 (e.g., a cable or a connector) is mounted to one end of the touch pad 214 and is configured to detect an external signal and transmit the detected signal to the electronic device 101 (e.g., the processor 120).

According to various embodiments of the disclosure, a wireless charging unit 320 configured to transmit wireless charging power may be disposed below the touch pad 214. According to one embodiment of the disclosure, the wireless charging unit 320 may include a charging coil (e.g., a power reception and/or power transmission coil) 322 for wireless charging. For example, the wireless charging unit 320 may use the charging coil 322 to wirelessly provide power required by another electronic device. For example, the wireless charging unit 320 may be stacked below the touch pad 214.

According to various embodiments of the disclosure, the wireless charging unit 320 may be a printed circuit board on which a pattern of the charging coil 322 is disposed, or a flexible printed circuit board.

According to various embodiments of the disclosure, the support member 310 may include a pad housing 312 in which the touch pad 214 and the wireless charging unit 320 are installed. For example, the pad housing 312 has a seating part 312a on which the touch pad and the wireless charging unit 320 can be stably placed. For example, the size of the seating part 312a may correspond to the size of the touch pad 214 and the wireless charging unit 320.

The above-described touch pad device may have a structure in which at least a part (e.g., the touch pad 214) thereof is exposed through an opening 302 formed in at least a portion of the first housing 211 of the electronic device 101. The opening 302 may be formed in at least a portion of the first housing 211, corresponding to the touch pad 214 and the wireless charging unit 320, and may have a size corresponding to the size of the touch pad 214 and the wireless charging unit 320.

The touch pad device may include an additional element in addition to the above-described elements. According to one embodiment of the disclosure, the touch pad device may further include a cover member which is provided above the touch pad 214 so as to protect the touch pad 214. Examples of the cover member may include a glass plate, a fiberglass-reinforced plastic (FRP) plate, a polyvinyl fluoride (PVF) film, a Mylar film, a polyester film, or an acrylic film. However, this is only an example, and the disclosure is not limited thereto. For example, the cover member may be made various types of materials which do not obstruct the transmission of wireless charging power. According to another embodiment of the disclosure, an insulating layer may be additionally included between the touch pad 214 and the wireless charging unit 320, and the touch pad 214 and the wireless charging unit 320 may be electrically connected to each other by the insulating layer.

Further, as described above, the touch pad device may have a structure in which the touch pad 214 and the wireless charging unit 320 are separate from each other. However, this is only an example, and the disclosure is not limited thereto. For example, the touch pad device may have a structure in which the wireless charging unit 320 and the touch pad 214 are be integrated into one.

Figure 4A:
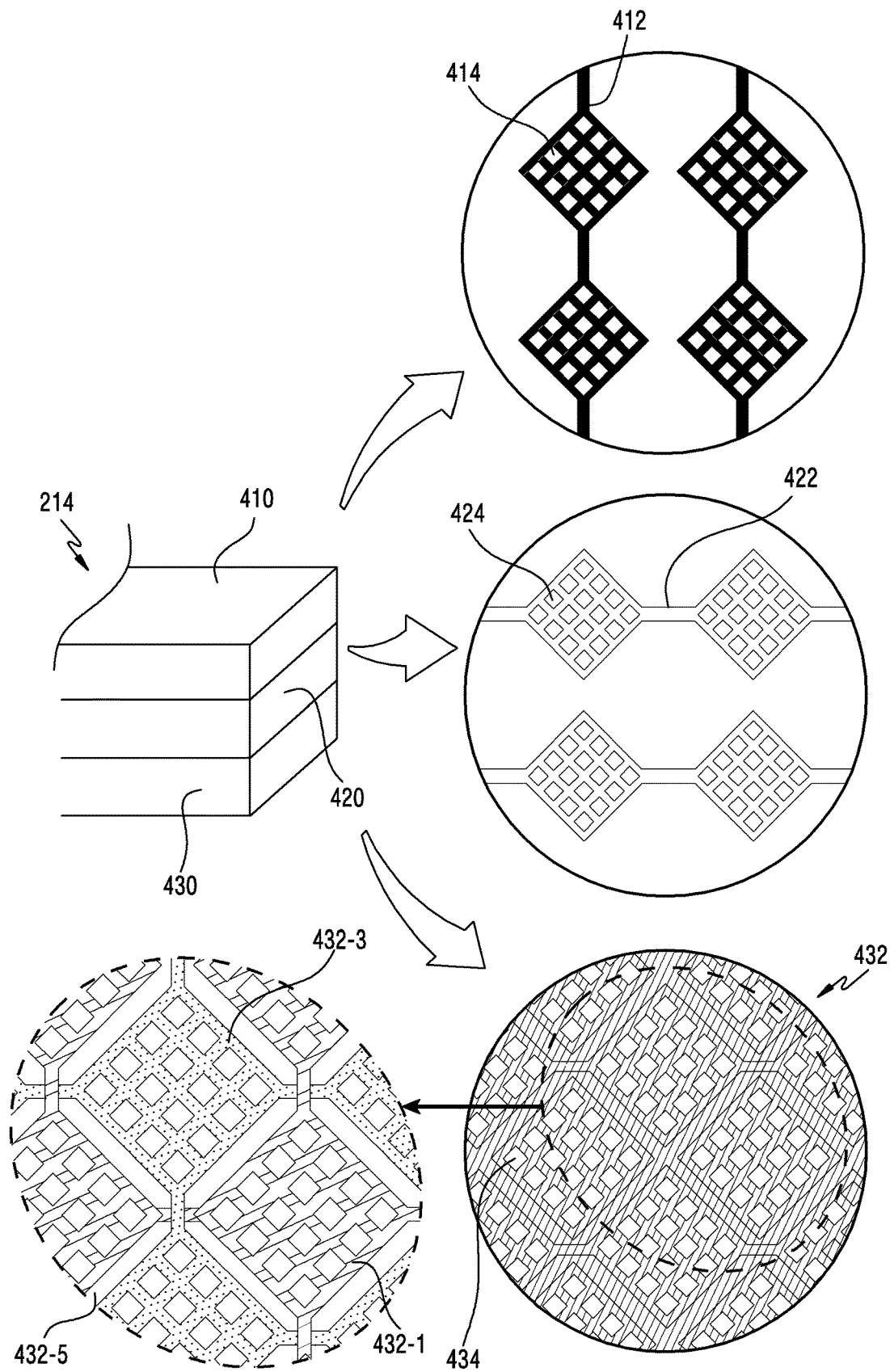
FIG. 4A illustrates a configuration of a touch pad according to an embodiment of the disclosure.
Figure 4B:
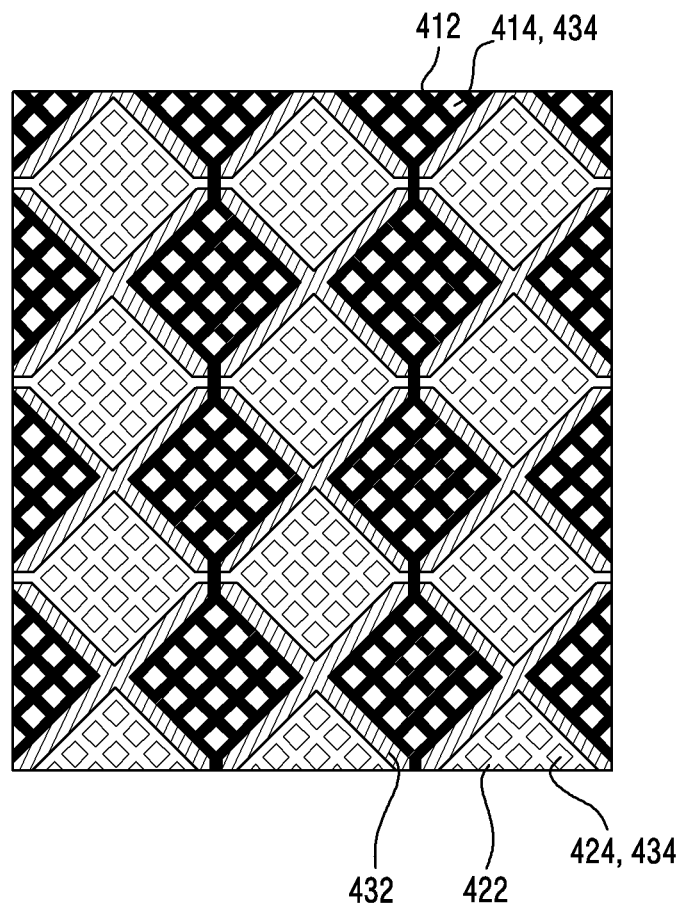
FIG. 4B illustrates a state in which a first sensor layer, a second sensor layer, and a ground layer of a touch panel lie one upon another according to an embodiment of the disclosure.

FIG. 4A illustrates a configuration of a touch pad according to an embodiment of the disclosure. FIG. 4B illustrates a state in which a first sensor layer, a second sensor layer, and a ground layer of a touch panel lie one upon another according to an embodiment of the disclosure Referring to FIG. 4A, the touch pad 214 may include: a first sensor layer 410 having first electrode patterns, a second sensor layer 420 having second electrode patterns, and a ground layer 430.

According to various embodiments of the disclosure, the first sensor layer 410 may include multiple first electrode patterns 412 formed in a first direction (e.g., the X-axis direction). The first electrode patterns 412 may be electrically connected to each other so as to enable a touched point to be detected. According to one embodiment of the disclosure, the first electrode patterns 412 may be regularly formed in a rhombus shape. However, this is only an example, and the disclosure is not limited thereto. As described later with reference to FIG. 5A to 5C, the first electrode patterns may be formed in a bar shape, or may be formed in various shapes.

According to various embodiments of the disclosure, the second sensor layer 420 may include multiple second electrode patterns 422 formed in a second direction (e.g., the Y-axis direction) which is different from the first direction. The second electrode patterns 422 may also be electrically connected to each other so as to enable a touched point to be detected. According to one embodiment of the disclosure, the second electrode patterns 422 may have the same shape as the first electrode patterns 412. However, this is only an example, and the disclosure is not limited thereto. For example, the shape of the second electrode patterns 422 may not correspond to the shape of the first electrode patterns 412.

According to one embodiment of the disclosure, each of the first electrode patterns 412 may have one or more openings 414, and each of the second electrode patterns 422 may also have one or more openings 424. According to one embodiment of the disclosure, the openings 414 and 424 formed in the first electrode patterns 412 and the second electrode patterns 422 may form paths through which charging power generated by the wireless charging unit 320 is transmitted. For example, as illustrated in FIG. 4A, the openings 414 formed in each of the first electrode patterns 412 and the openings 424 formed in each of the second electrode patterns 422 may have a 4×4 arrangement and may have a rhombus shape. However, this is only an example, and the disclosure is not limited thereto. For example, the openings 414 and 424 formed in the first electrode patterns 412 and second electrode patterns 422 may be various arranged, and the shape, the size, and the number of the openings are not be limited either.

According to various embodiments of the disclosure, one or more ground patterns 432 may be formed at the ground layer 430. The ground patterns 432 may include multiple first ground patterns 432-1 formed in a first direction (e.g., the X-axis direction), and multiple second ground patterns 432-3 formed in a second direction (e.g., the Y-axis direction) which is different from the first direction. However, this is only an example, and the disclosure is not limited thereto. According to one embodiment of the disclosure, charging power generated by the wireless charging unit 320 may be transmitted by using a space 432-5 formed between the ground patterns (e.g., reference numerals 432-1 and 432-3).

According to one embodiment of the disclosure, the ground patterns 432 may be aligned with at least one of the first electrode patterns 412 or the second electrode patterns 422. For example, the first ground patterns 432-1 may be aligned with the first electrode patterns 412, respectively, and the second ground patterns 432-3 may be aligned with the second electrode patterns 422, respectively.

According to various embodiments of the disclosure, the first ground patterns 432-1 and the second ground patterns 432-3 may be electrically connected to each other to form one ground pattern.

According to various embodiments of the disclosure, the ground patterns 432 may have the same shape as the first electrode patterns 412 and the second electrode patterns 422. The position of the ground patterns 432 may correspond to the position of the first electrode patterns 412 and the position of the second electrode patterns 422. However, this is only an example, and the disclosure is not limited thereto. For example, the shape and position of at least some of the ground patterns 432 may not correspond to the shape and position of electrode patterns (e.g., the first electrode patterns 412 and the second electrode patterns 422).

According to various embodiments of the disclosure, one or more openings 434 may be formed in the ground layer 430 (e.g., the ground pattern 432). According to one embodiment of the disclosure, the position of the openings 434 formed in the ground layer 430 may correspond to the position of the opening 414 formed in the first electrode patterns 412 and the position of the opening 424 formed in the second electrode patterns 422.

According to various embodiments of the disclosure, the touch pad 214 may be formed by laying the first sensor layer 410, the second sensor layer 420, and the ground layer 430 one upon another.

Referring to FIG. 4B, the first electrode patterns 412 and the second electrode patterns 422 may be uniformly formed on the front surface of the touch pad 214 by the first sensor layer 410 and the second sensor layer 420, and the openings 414, 424, and 434 may also be uniformly formed on the front surface of the touch pad 214 by the first sensor layer 410, the second sensor layer 420, and the ground layer 430. Thanks to the openings 414, 424, and 434, charging power can pass through the touch pad 214 without being interrupted by the first sensor layer 410, the second sensor layer 420, and the ground layer 430, and thus the wireless charging efficiency of the wireless charging unit 320 (or the electronic device 101) may be improved. Further, as described above, the ground layer 430 may be aligned with at least one of the first electrode pattern or the second electrode pattern, and thus a capacitance value of the touch pad 214 may be prevented from being changed by the wireless charging unit 320.

It has been described that the first electrode pattern 412, the second electrode pattern 422, and the ground pattern 432 of the first electrode patterns 412 are formed on different layers, respectively. However, this is only an example, and the disclosure is not limited thereto. For example, at least one of the first electrode patterns 412, the second electrode patterns 422, or the ground pattern 432 may be formed on the same layer. Further, it has been described that one or more openings 414, 424, and 434 are formed in the first electrode pattern 412, the second electrode pattern 422, and the ground pattern 432 of the touch pad 214, respectively. However, one or more openings may be formed in at least one of the first electrode pattern 412, the second electrode pattern 422, or the ground pattern 432.

Figure 5A:
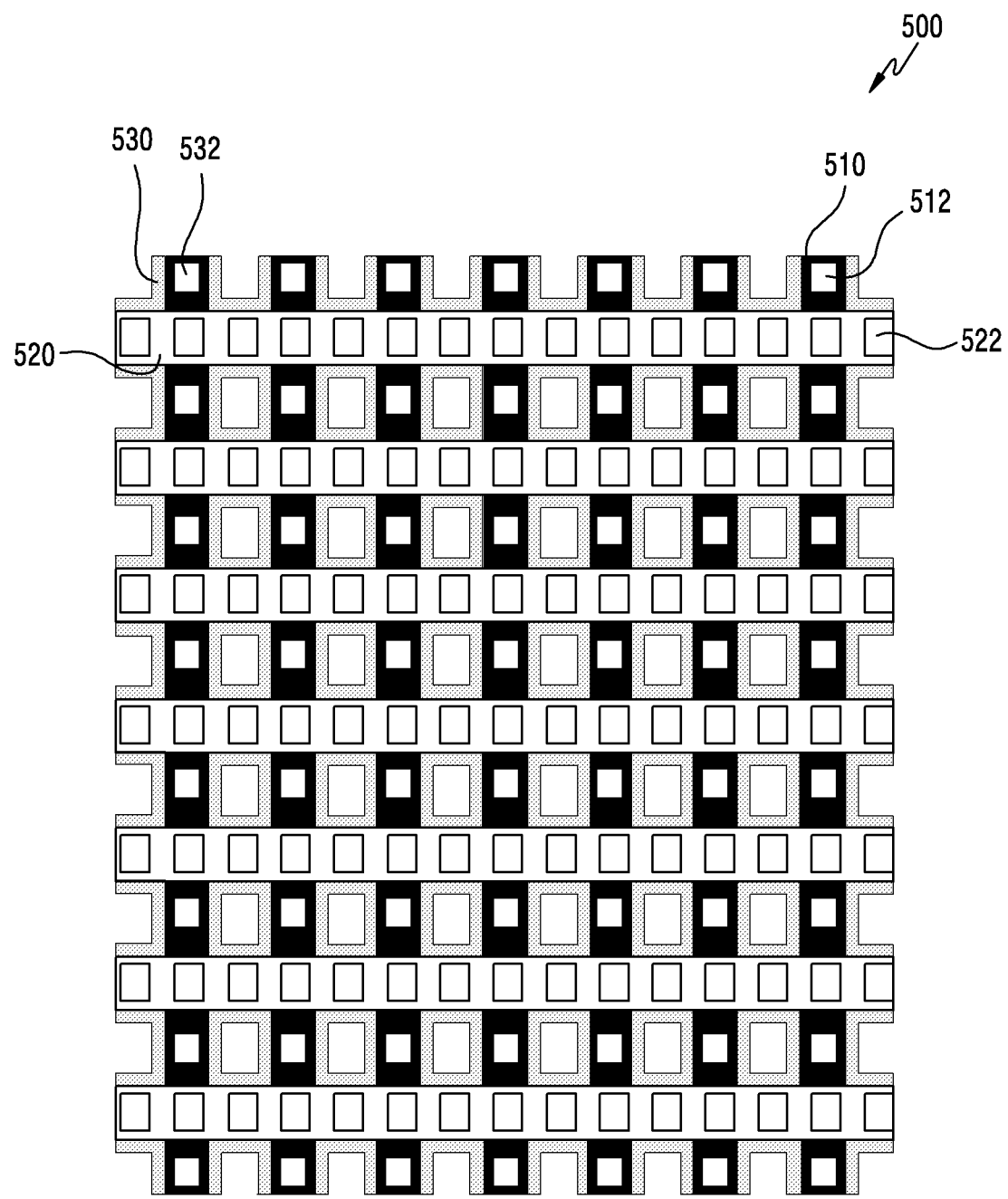
FIG. 5A illustrates an opening formed in a touch pad having a bar-shaped electrode pattern according to an embodiment of the disclosure.
Figure 5B:
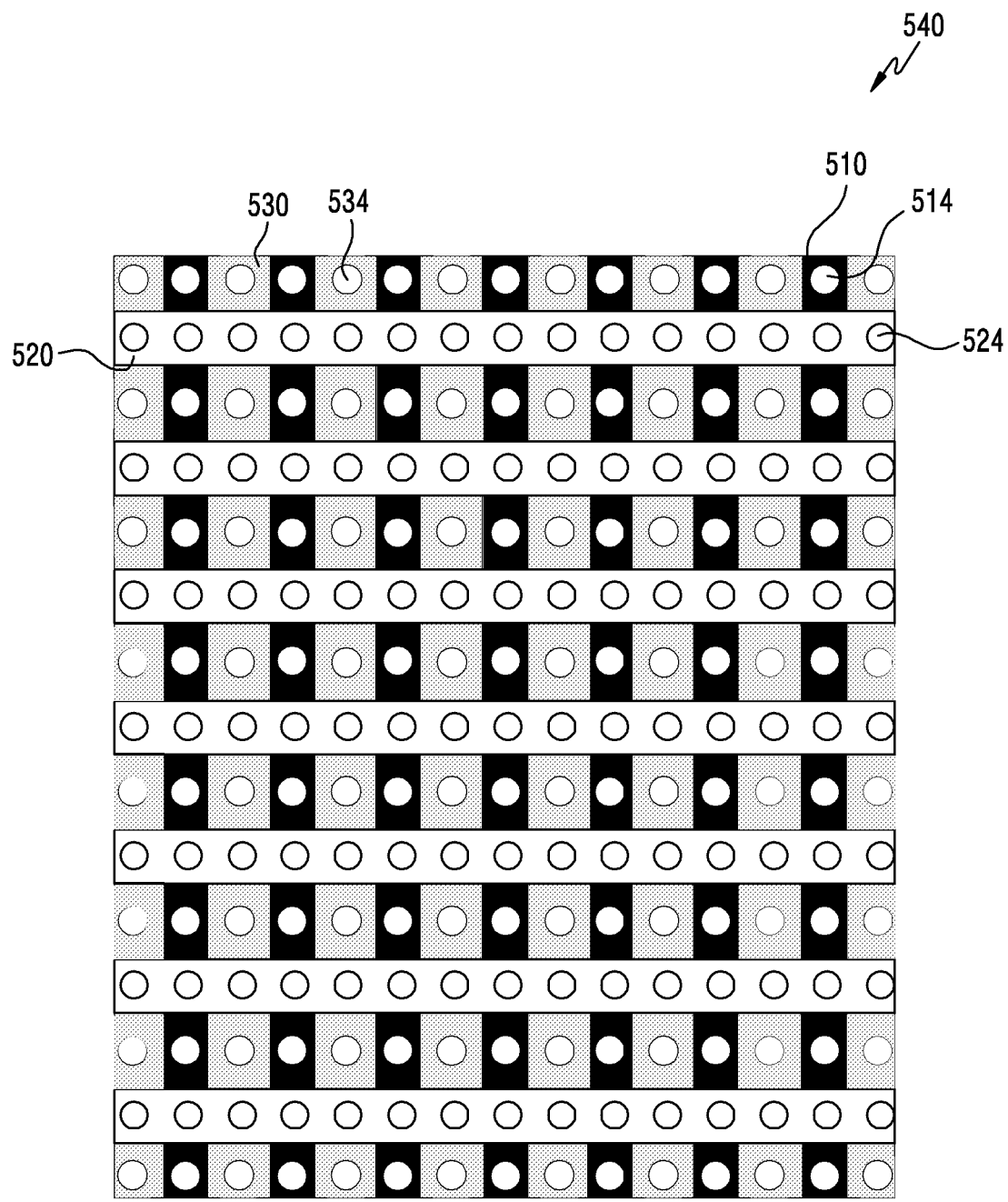
FIG. 5B illustrates an opening formed in a touch pad having a bar-shaped electrode pattern according to an embodiment of the disclosure.
Figure 5C:
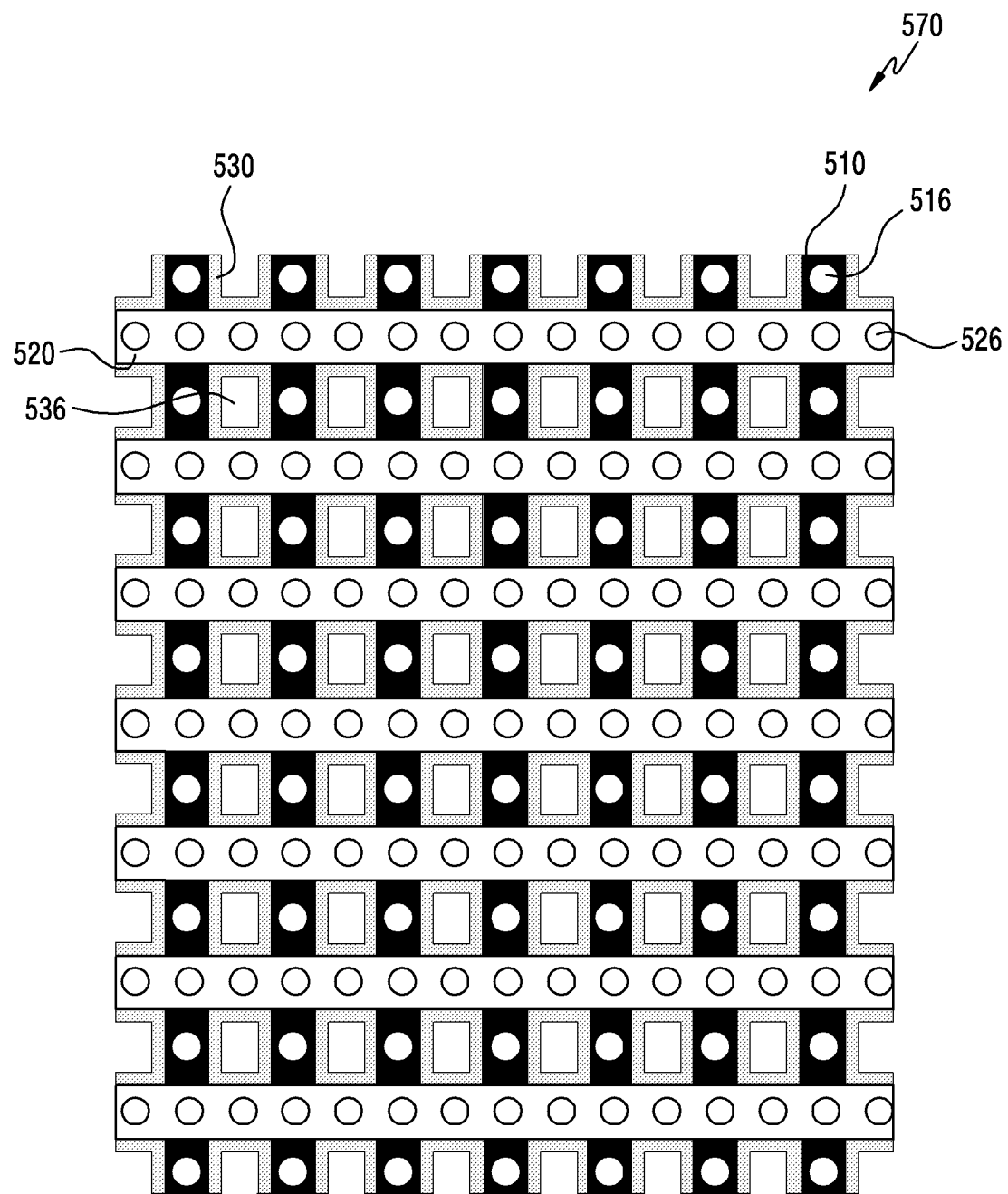
FIG. 5C illustrates an opening formed in a touch pad having a bar-shaped electrode pattern according to an embodiment of the disclosure.

FIG. 5A is a view illustrating an opening formed in a touch pad having a bar-shaped electrode pattern according to an embodiment of the disclosure. FIG. 5B is a view 540 illustrating an opening formed in a touch pad having a bar-shaped electrode pattern according to an embodiment of the disclosure. FIG. 5C is a view illustrating an opening formed in a touch pad having a bar-shaped electrode pattern according to an embodiment of the disclosure.

Referring to FIG. 5A, unlike the touch pad 214 illustrated in FIGS. 4A and 4B, a touch pad 500 may be formed by laying a first sensor layer 510 having a bar-shaped first electrode pattern formed in a first direction (e.g., the X-axis direction), a second sensor layer 520 having a bar-shaped second electrode pattern formed in a second direction (e.g., the Y-axis direction), and a ground layer 530 one upon another. According to one embodiment of the disclosure, the first sensor layer 510 (or the first electrode pattern) may include one or more openings 512, and the second sensor layer 520 (or the second electrode pattern) may include one or more openings 522. Further, one or more openings 532 may also be formed in the ground layer 530. According to one embodiment of the disclosure, the position of the openings 532 formed in the ground layer 530 may correspond to the position of the openings 512 formed in the first sensor layer 510 and the position of the openings 522 formed in the second sensor layer 520. For example, as illustrated in FIG. 5A, the one or more openings 512, 522, and 532, which are formed in the first sensor layer 510, the second sensor layer 520, and the ground layer 530, may have a quadrangular shape. However, this is only an example, and the disclosure is not limited thereto.

Referring to FIG. 5B, a touch pad 540 may include circular openings 514, 524, and 534, which are formed in a first sensor layer 510, a second sensor layer 520, and a ground layer 530, respectively, and the openings may have various shapes, such as a hexagonal shape or a triangular shape. In another example, an opening formed in at least one of the first sensor layer 510, the second sensor layer 520, or the ground layer 530 may have a shape which is different from that of an opening formed in each of the remaining layers. The first sensor layer 510 may include an opening having a shape which is different from that of an opening included in the second sensor layer 520. In another example, multiple different openings may be formed in at least one of the first sensor layer 510, the second sensor layer 520, or the ground layer 530.

Referring to FIG. 5C, a ground layer 530 of a touch pad 570 may include a first group of openings 516 and 526 (e.g., circular openings), the shape of which corresponds to the shape of openings of a first sensor layer 510 and a second sensor layer 520, and a second group of openings 536 (e.g., quadrangular openings) which are different in shape from the first group of openings.

Figure 6:
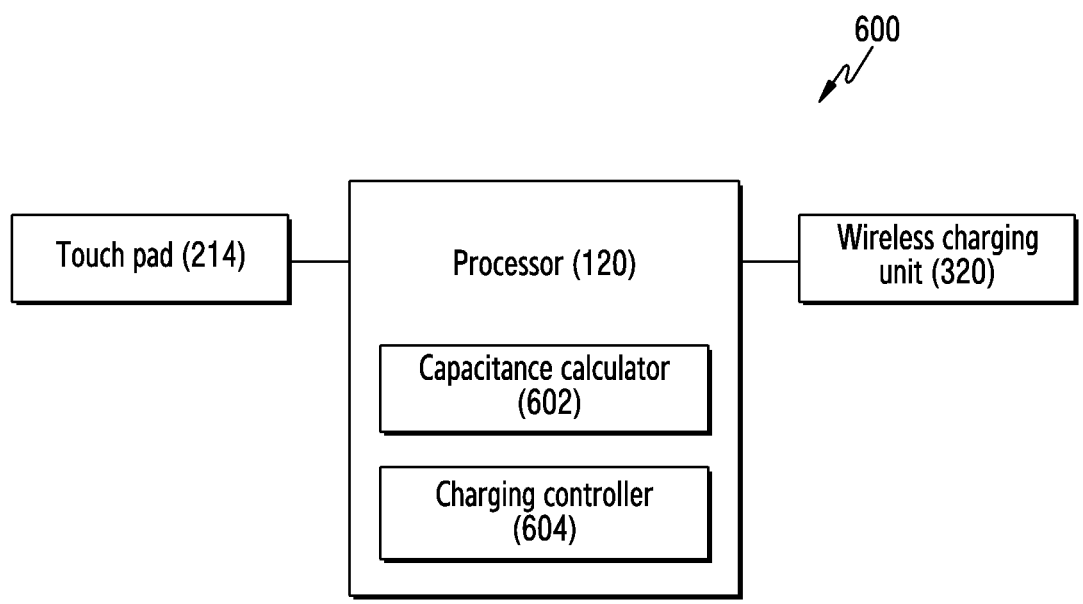
FIG. 6 illustrates an electronic device for providing a wireless charging function according to an embodiment of the disclosure.

FIG. 6 is a view 600 illustrating an electronic device for providing a wireless charging function according to an embodiment of the disclosure.

Referring to FIG. 6, the electronic device 101 may include: the touch pad 214, the wireless charging unit 320 (e.g., the wireless charging coil 322), and the processor 120.

According to various embodiments of the disclosure, as described above with reference to FIG. 3, the touch pad 214 may detect a designated signal according to a touch by an inputting subject (or an inputting subject body) (e.g., a part of the human body, an electronic pen, etc.), and may process input of a position at which a user desires to point, based at least partially on the detected signal. For example, the touch pad 214 may transmit information related to coordinates (e.g., an X-axis coordinate and/or a Y-axis coordinate) of a touched point thereon to the processor 120.

According to various embodiments of the disclosure, the processor 120 may determine, based at least partially on the information provided from the touch pad 214, the distribution of detection nodes of which a capacitance variation has been detected among detection nodes of the touch pad 214. For example, the processor 120 may determine a standard deviation of capacitance for the detection nodes, the capacitance variation of which has been detected. The standard deviation may be calculated by a capacitance calculator 602. For example, as described later with reference to FIG. 8, the capacitance calculator 602 may calculate a standard deviation based on a capacitance variation calculated by comparing capacitance before touch input is detected with capacitance when touch input has been detected (or after touch input is detected).

According to one embodiment of the disclosure, the processor 120 may determine the inputting subject, based on the calculated standard deviation of capacitance. For example, the processor 120 may determine whether the inputting subject touching the touch pad 214 is a subject requiring a charging function or a subject requiring a touch function. For example, when the calculated standard deviation exceeds a predesignated reference deviation range, the processor 120 may determine that touch input has been performed by an inputting subject (e.g., a finger, a palm, or an electronic pen) requiring a touch function. The reference deviation range may be a range of capacitance which may be changed by a predesignated inputting subject requiring a touch function. Further, when the calculated standard deviation does not exceed the predesignated reference deviation range, the processor 120 may determine that touch input has been performed by an inputting subject requiring a charging function (e.g., an electronic device (e.g., a smart phone or an earphone) supporting a wireless charging function).

According to one embodiment of the disclosure, the processor 120 may control a wireless charging function, based on the result of determining the inputting subject. For example, when it is determined that touch has been performed by an inputting subject requiring a touch input function, the processor 120 may perform a touch detection function. For example, the touch detection function may be a mode for activating the touch pad 214 and deactivating the wireless charging unit 320. For example, the wireless charging unit 320 may be deactivated by control of a charging controller 604.

According to one embodiment of the disclosure, when it is determined that touch has been performed by an inputting subject requiring a wireless charging function, the processor 120 may stop the touch detection function and may perform a charging function. For example, the processor 120 may perform a charging function of transmitting a designated signal (e.g., a ping signal) for determining the presence of a wireless power receiving unit (e.g., a charging power receiving coil) and identifying the wireless power receiving unit. For example, the wireless charging unit 320 may be activated by control of the charging controller 604. In another example, the processor 120 may prevent unnecessary power consumption by deactivating the touch pad 214 while the charging function is being performed. Further, the processor 120 may stop performing charging function when the processor 120 does not determine the presence of the wireless power receiving unit or does not identify the wireless power receiving unit.

According to one embodiment of the disclosure, the processor 120 may monitor the state of an inputting subject (e.g., the wireless power receiving unit) while the charging function is being performed. Further, the processor 120 may control an operation of the wireless charging unit 320, based on the result of the monitoring. For example, the processor 120 may finish performing the wireless charging function when the wireless power receiving unit is beyond a designated distance from the touch pad 214 or when a signal notifying of completion of charging is received from the wireless power receiving unit. For example, the processor 120 may activate the touch pad 214 and deactivate the wireless charging unit 320.

Further, it has been described above that the processor 120 includes the capacitance calculator 602 and the charging controller 604. This is for ease of understanding of the disclosure, and an operation of the capacitance calculator 602 and an operation of the charging controller 604 may be described as being performed by the processor 120.

According to various embodiments of the disclosure, an electronic device (e.g., the electronic device 101) for supporting a wireless charging function may include a housing (e.g., the first housing 211), a touch pad 214 which is disposed in the housing and includes electrode patterns (e.g., the first electrode pattern 412 and the second electrode pattern 422) and multiple openings (e.g., the opening 414 and the opening 424) formed on the electrode patterns, a wireless charging coil (e.g., the wireless charging coil 322) disposed below the touch pad and configured to wirelessly transmit power through the multiple openings, and a processor (e.g., the processor 120) operationally connected to the touch pad and the wireless charging coil. According to one embodiment of the disclosure, the processor may be configured to perform a touch detection function of detecting a touch by an inputting subject by using at least one electrode pattern of the touch pad, calculate a capacitance variation of the touch pad while the touch detection function is performed, determine whether the inputting subject requires a charging function, based on the calculated capacitance variation, and, in response to determining that the inputting subject requires the charging function, perform a charging function of transmitting power by using the wireless charging coil.

According to various embodiments of the disclosure, the processor may be configured to determine a subject recognition area having a predetermine range, based on an area in which the touch by the inputting subject has been detected, calculate a surface deviation for the determined subject recognition area, and determine whether the inputting subject requires a charging function by using the calculated standard deviation.

According to various embodiments of the disclosure, the processor may be configured to perform the touch detection function of activating the touch pad and deactivating the wireless charging coil.

According to various embodiments of the disclosure, the processor may be configured to perform the charging function of activating the wireless charging coil and deactivating the touch pad.

According to various embodiments of the disclosure, the processor may be configured to transmit, in response to performing the charging function, a designated signal for determining the presence of a wireless power receiving unit and identifying the wireless power receiving unit.

According to various embodiments of the disclosure, the processor may be configured to stop performing the charging function when the presence of the wireless power receiving unit is not determined or when the wireless power receiving unit is not identified.

According to various embodiments of the disclosure, the processor may be configured to: monitor a state of the inputting subject while the charging function is performed, and stop performing the charging function when the state of the inputting subject satisfies a designated condition.

According to various embodiments of the disclosure, the designated condition may include at least one of a case in which the inputting subject is beyond a designated distance from the touch pad or a case in which a signal notifying of completion of charging is received from the inputting subject.

According to various embodiments of the disclosure, the touch pad may include: a first sensor layer (e.g., the first sensor layer 410) which includes a first electrode pattern and multiple first openings formed on the first electrode pattern, and a second sensor layer (e.g., the second sensor layer 420) which is disposed beneath the first sensor layer and includes a second electrode pattern and multiple second openings formed on the second electrode pattern.

According to various embodiments of the disclosure, the touch pad may further include a ground layer (e.g., the ground layer 430) which is disposed beneath the second sensor layer and is configured to be aligned with at least one the first electrode pattern or the second electrode pattern.

According to various embodiments of the disclosure, the ground layer may include at least one third opening (e.g., the openings 434), and the wireless charging coil may wirelessly transmit power through the multiple first openings, the multiple second openings, and the at least one third opening.

According to various embodiments of the disclosure, the position of the at least one third opening may correspond to at least one of the position of the multiple first openings or the position of the multiple second openings.

Figure 7:
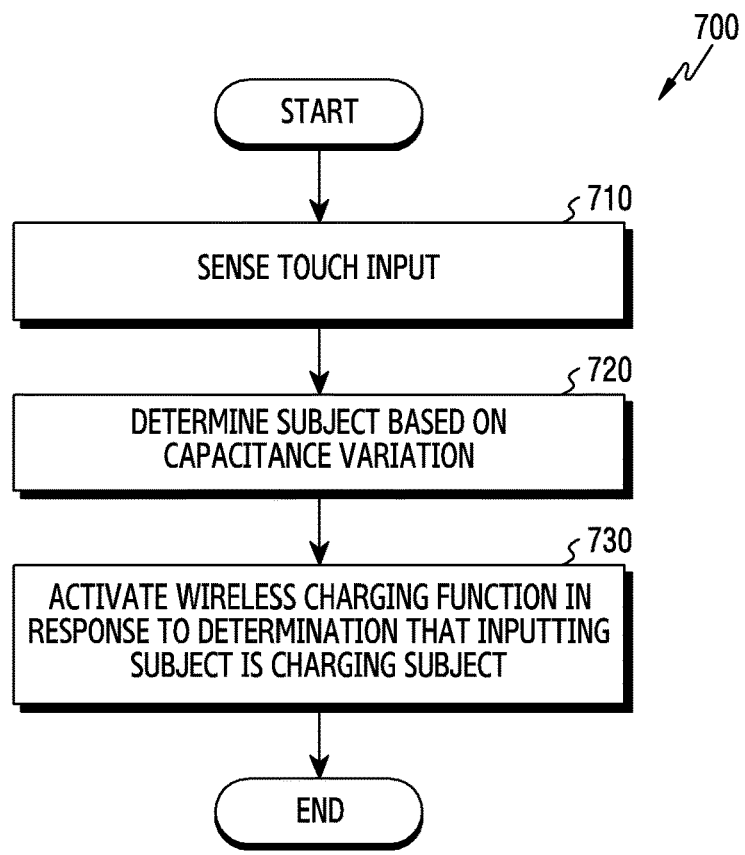
FIG. 7 is a flowchart illustrating a method for providing a wireless charging function by an electronic device according to an embodiment of the disclosure.

FIG. 7 is a flowchart 700 illustrating a method for providing a wireless charging function by an electronic device according to an embodiment of the disclosure. Hereinafter, in an embodiment of the disclosure, operations may be sequentially performed, but are not necessarily performed in sequence. For example, the order of operations may be changed, and at least two operations may be performed in parallel.

Referring to FIG. 7, according to various embodiments of the disclosure, in operation 710, the electronic device 101 (e.g., the processor 120 in FIG. 1) may detect touch input. According to one embodiment of the disclosure, the processor 120 may detect touch input on the touch pad 214 while the wireless charging unit 320 (e.g., the wireless charging coil 322) is deactivated.

According to various embodiments of the disclosure, in operation 720, the electronic device 101 (e.g., the processor 120 in FIG. 1) may determine a touch inputting subject, based on a capacitance variation. According to one embodiment of the disclosure, the processor 120 may calculate a capacitance variation amount (capacitance variation rate) by comparing first capacitance when the touch input has not been detected with second capacitance when the touch input has been detected, and may use the calculated capacitance variation amount to determine the inputting subject which has performed the touch input. For example, as described above, an inputting subject may be divided into a subject requiring a charging function and a subject requiring a touch function, and the subjects may generate different capacitance variations when touching a touch pad. In view thereof, the processor 120 may store a capacitance variation amount in a table form, and may determine a touch inputting subject corresponding to a calculated capacitance variation amount.

According to various embodiments of the disclosure, in operation 730, the electronic device 101 (e.g., the processor 120 in FIG. 1) may activate a wireless charging function in response to determination that the inputting subject is a charging subject requiring a charging function. According to one embodiment of the disclosure, the processor 120 may activate the wireless charging unit 320 to perform the charging function. For example, as described above with reference to the FIGS. 4A and 4B, power generated by the activated wireless charging unit 320 may be transmitted to the touch inputting subject through a path (e.g., at least one opening) formed in the touch pad 214. According to various embodiments of the disclosure, the processor 120 may prevent unnecessary power consumption by deactivating the touch pad 214 while the charging function is being performed.

Figure 8:
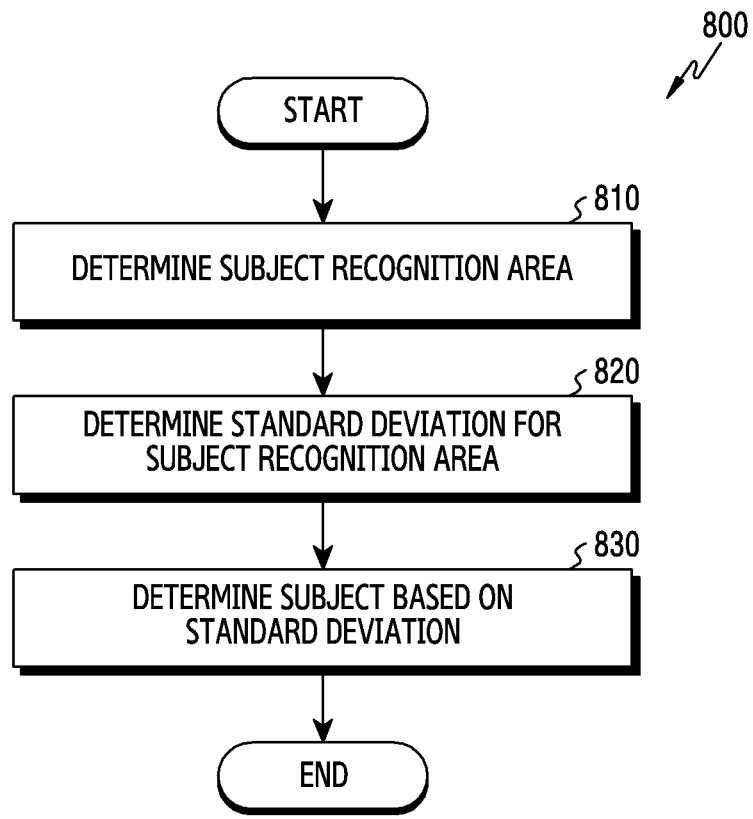
FIG. 8 is a flowchart illustrating a method for determining a touch inputting subject in an electronic device according to an embodiment of the disclosure.

FIG. 8 is a flowchart 800 illustrating a method for determining a touch inputting subject in an electronic device according to an embodiment of the disclosure. Operations of FIG. 8, described below, may be various embodiments of operation 720 in FIG. 7. Hereinafter, in an embodiment of the disclosure, operations may be sequentially performed, but are not necessarily performed in sequence. For example, the order of operations may be changed, and at least two operations may be performed in parallel.

Referring to FIG. 8, according to various embodiments of the disclosure, in operation 810, the electronic device 101 (e.g., the processor 120 in FIG. 1) may determine (or configure) a subject recognition area of a touch pad. The subject recognition area is a criterion for distinguishing between a subject requiring a charging function and a subject requiring a touch function, and may be a criterion range in which a face of an inputting subject (e.g., a subject requiring a charging function) touching the touch pad can be recognized. According to one embodiment of the disclosure, the processor 120 may determine the subject recognition area, based on at least some detection nodes of the touch pad 214, capacitance variations of which have been detected. For example, the processor 120 may determine a subject recognition area which includes eight detection nodes in the X-axis and eight detection nodes in the Y-axis with reference to a detection node of which the maximum capacitance has been detected among the detection nodes, the capacitance variations of which has been detected. However, this is only an example, and the processor 120 may determine a subject recognition area having various numbers of detection nodes.

According to various embodiments of the disclosure, in operation 820, the electronic device 101 (e.g., the processor 120 in FIG. 1) may calculate a standard deviation for the determined subject recognition area. According to one embodiment of the disclosure, the processor 120 may use the standard deviation to determine the distribution of detection nodes, the capacitance variations of which has been detected, in the subject recognition area. For example, the processor 120 may obtain a standard deviation for the subject recognition area by calculating an average value of deviations (e.g., a difference between the capacitance of detection nodes and the average capacitance of the subject recognition area) of detection nodes included in a subject recognition area and then obtaining a square root of the average value of deviations, as in Equation 1 below.

$$\sigma = \sqrt{\frac{\sum_{i=0}^{7} \sum_{j=0}^{7} \{\Delta C(a+i, b+j) - ч\}^2}{64}}$$

$$ч = \frac{1}{64} \sum_{i=0}^{7} \sum_{j=0}^{7} \Delta C(a+i, b+j)$$

Equation 1

For example, in Equation 1, σ denotes a standard deviation for a subject recognition area, ч denotes the average capacitance of the subject recognition area, and ΔC(a+i, b+j) denotes deviations of nodes a and b included in the subject recognition area.

According to various embodiments of the disclosure, in operation 830, the electronic device 101 (e.g., the processor 120 in FIG. 1) may determine a touch inputting subject, based on the standard deviation. According to one embodiment of the disclosure, the processor 120 may determine the touch inputting subject by using a standard deviation table for a predefined subject recognition area.

TABLE 1

| Inputting subject | Standard deviation | Type |
|---|---|---|
| Electronic pen | First range (e.g., 600-) | Touch function |
| Finger | Second range (e.g., 500-599) | Touch function |
| Palm | Third range (e.g., 200-499) | Touch function |
| Wireless earphone | Fourth range (e.g., 80-99) | Wireless charging function |
| Electronic device (smartphone) | Fifth range (e.g., 50-79) | Wireless charging function |

For example, the processor 120 may determine that an electronic pen requiring a touch function has been detected, based on calculation of a standard deviation corresponding to the first range. The processor 120 may determine a finger and a palm in the same way. In another example, the processor 120 may determine that a wireless earphone requiring a wireless charging function has been detected, based on calculation of a standard deviation corresponding to a fourth range, and, in the same way, may determine that touch is performed by an electronic device.

Figure 9:
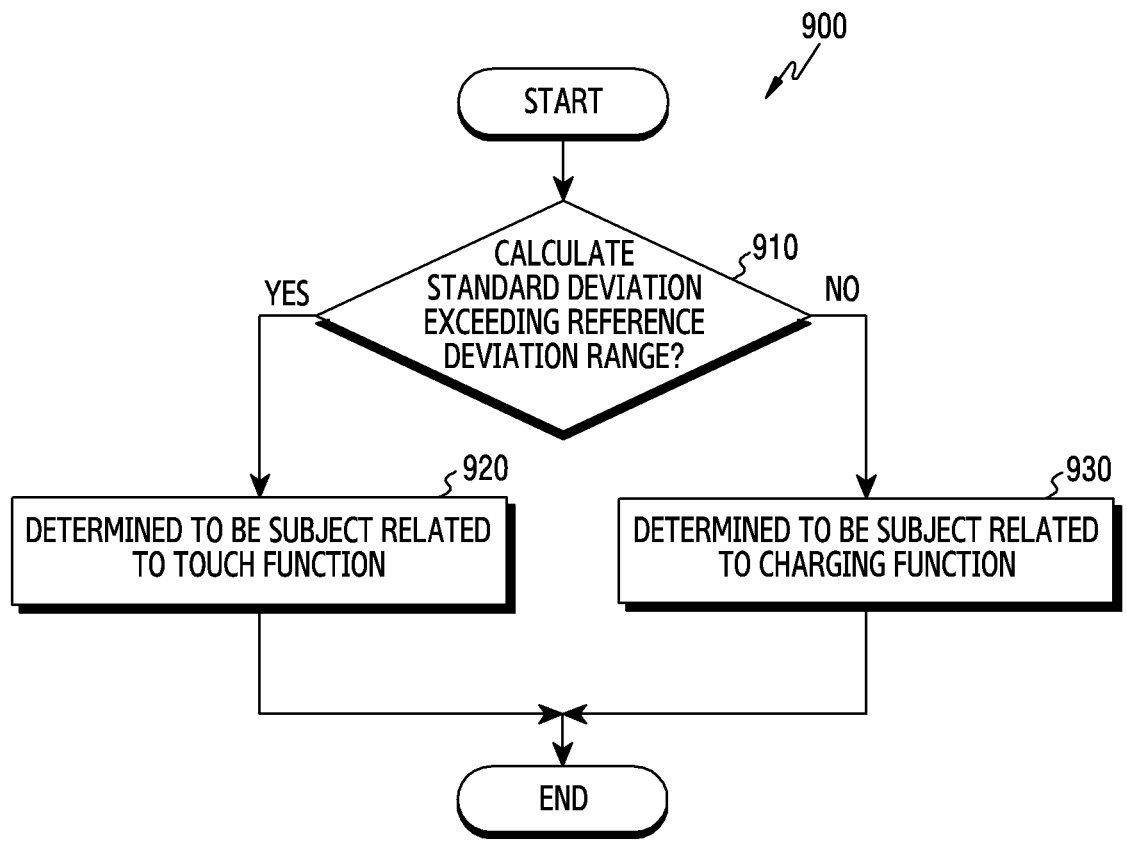
FIG. 9 is a flowchart illustrating a method for determining, based on a standard deviation, a touch inputting subject in an electronic device according to an embodiment of the disclosure.

FIG. 9 is a flowchart 900 illustrating a method for determining, based on a standard deviation, a touch inputting subject in an electronic device according to an embodiment of the disclosure. Operations in FIG. 9, described below, may be various embodiments of operation 830 in FIG. 8. Hereinafter, in an embodiment of the disclosure, operations may be sequentially performed, but are not necessarily performed in sequence. For example, the order of operations may be changed, and at least two operations may be performed in parallel.

Referring to FIG. 9, according to various embodiments of the disclosure, in operation 910, the electronic device 101 (e.g., the processor 120 in FIG. 1) may determine whether a calculated standard deviation is outside a reference deviation range. According to one embodiment of the disclosure, as described above, the reference deviation range may be a range of capacitance which may be changed by a predesignated inputting subject requiring a touch function. For example, the reference deviation range may have a standard deviation for distinguishing between the inputting subjects requiring a touch function and the inputting subjects requiring a wireless charging function, described in Table 1, for example, may include a range which exceeds the fourth range but does not exceed the third range.

According to various embodiments of the disclosure, when a standard deviation exceeding the reference deviation range is calculated, the electronic device 101 (e.g., the processor 120 in FIG. 1) may determine, in operation 920, that a subject related to a touch function has been detected.

According to various embodiments of the disclosure, when a standard deviation not exceeding the reference deviation range is calculated, the electronic device 101 (e.g., the processor 120 in FIG. 1) may determine, in operation 930, that a subject related to a wireless charging function has been detected.

FIG. 10A illustrates a measurement value related to a capacitance characteristic of a touch pad for touch inputting subjects according to an embodiment of the disclosure. FIG. 10B illustrates a measurement value related to a capacitance characteristic of a touch pad for touch inputting subjects according to an embodiment of the disclosure. FIG. 10C illustrates a measurement value related to a capacitance characteristic of a touch pad for touch inputting subjects according to an embodiment of the disclosure. FIG. 10D illustrates a measurement value related to a capacitance characteristic of a touch pad for touch inputting subjects according to an embodiment of the disclosure.

Referring to FIG. 10A, a capacitance value of the touch pad 214 touched by a finger requiring a touch function may be digitally converted, and a subject recognition area 1010 may be configured around a position in which touch input has been detected. Specifically, a standard deviation of the configured subject recognition area 1010 may be about 515.2673966.

Referring to FIG. 10B, a capacitance value of the touch pad 214 touched by a palm requiring a touch function may be digitally converted, and a subject recognition area 1020 may be configured around a position in which touch input has been detected. Specifically, a standard deviation of the configured subject recognition area 1020 may be about 437.4729275, and may be slightly smaller than the standard deviation when the finger touches the touch pad.

Referring to FIG. 10C, a capacitance value of the touch pad touched by an electronic device requiring a wireless charging function may be digitally converted, and a subject recognition area 1030 may be configured around a position in which touch input has been detected. Specifically, a standard deviation of the configured subject recognition area may be about 68.733606.

Referring to FIG. 10D, a capacitance value of the touch pad touched by a wireless earphone requiring a wireless charging function may be digitally converted, and a subject recognition area 1040 may be configured around a position in which touch input has been detected. Specifically, a standard deviation of the configured subject recognition area may be about 91.80274449, and may be slightly greater than the standard deviation when the electronic device touches the touch pad.

Referring to FIGS. 10A to 10D, it is found that the standard deviation for the touch pad 214 when the electronic device or the wireless earphone, requiring a wireless charging function, touches the touch pad 214 was down significantly from the standard deviation when the finger or the palm touches the touch pad 214. This may signify that standard deviations of different ranges are measured depending on characteristics of inputting subjects touching the touch pad 214.

Figure 11:
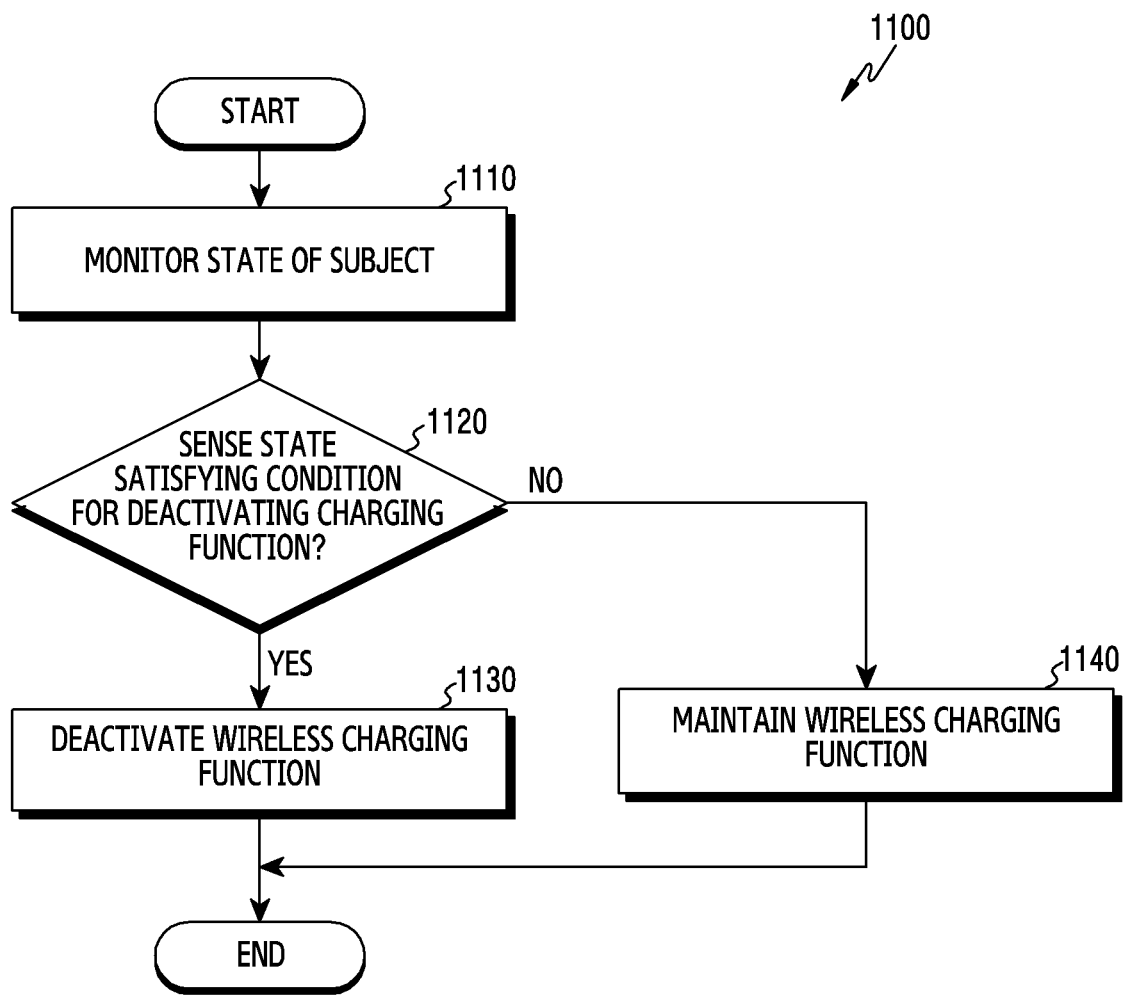
FIG. 11 is a flowchart illustrating a method for deactivating a wireless charging function in an electronic device according to an embodiment of the disclosure.

FIG. 11 is a flowchart 1100 illustrating a method for deactivating a wireless charging function in an electronic device according to an embodiment of the disclosure. Operations of FIG. 11, described below, may be various embodiments of operation 730 in FIG. 7. Hereinafter, in an embodiment of the disclosure, operations may be sequentially performed, but are not necessarily performed in sequence. For example, the order of operations may be changed, and at least two operations may be performed in parallel.

Referring to FIG. 11, in operation 1110, the electronic device 101 (e.g., the processor 120 in FIG. 1) according to various embodiments may monitor the state of a subject (e.g., a wireless power receiving unit) provided with a charging function. According to one embodiment of the disclosure, the processor 120 may determine, through the monitoring, a state in which a subject is beyond a designated distance from the touch pad 214 (or a state in which the subject is positioned within the designated distance from the touch pad 214), a state in which charging a subject is completed (or a state in which charging the subject is being performed), etc. For example, the processor 120 may perform monitoring by periodically transmitting and receiving a designated signal via a wireless charging unit.

According to various embodiments of the disclosure, in operation 1120, the electronic device 101 (e.g., the processor 120 in FIG. 1) may determine whether a state satisfying a charging function deactivation condition has been detected. According to one embodiment of the disclosure, the charging function deactivation condition may include a state in which a subject is beyond a designated distance from the touch pad 214, a state in which charging a subject is completed, etc.

According to various embodiments of the disclosure, when the state satisfying the charging function deactivation condition is detected, the electronic device 101 (e.g., the processor 120 in FIG. 1) may deactivate a wireless charging function in operation 1130. For example, the processor 120 may perform a touch detection function of activating the touch pad 214 and deactivating the wireless charging unit 320.

According to various embodiments of the disclosure, when a state in which the charging function deactivation condition is satisfied is detected, the electronic device 101 (e.g., the processor 120 in FIG. 1) may maintain the wireless charging function in operation 1140. For example, the processor 120 may perform a charging function of deactivating the wireless charging unit 320.

According to various embodiments of the disclosure, a method of an electronic device, which includes a wireless charging coil and a touch pad including an electrode pattern and multiple openings formed on the electrode pattern, may include: performing a touch detection function of detecting a touch by an inputting subject by using at least one electrode pattern of the touch pad, calculating a capacitance variation of the touch pad while the touch detection function is performed, determining whether the inputting subject requires a charging function, based on the calculated capacitance variation, and, in response to determining that the inputting subject requires the charging function, performing a charging function of wirelessly transmitting power through the multiple openings by using the wireless charging coil.

According to various embodiments of the disclosure, the calculating of the capacitance variation may include determining a subject recognition area having a predetermined range, based on an area in which the touch by the inputting subject has been detected, and calculating a standard deviation for the determined subject recognition area.

According to various embodiments of the disclosure, the performing of the touch detection function may include activating the touch pad and deactivating the wireless charging coil.

According to various embodiments of the disclosure, the performing of the charging function may include activating the wireless charging coil and deactivating the touch pad.

According to various embodiments of the disclosure, the performing of the charging function may include transmitting a designated signal for determining a presence of a wireless power receiving unit and identifying the wireless power receiving unit.

According to various embodiments of the disclosure, the performing of the charging function may include stopping performing the charging function when the presence of the wireless power receiving unit is not determined or when the wireless power receiving unit is not identified.

According to various embodiments of the disclosure, the performing of the charging function may include monitoring a state of the inputting subject while the charging function is performed, and stopping performing the charging function when the state of the inputting subject satisfies a designated condition.

According to various embodiments of the disclosure, the designated condition may include at least one of a case in which the inputting subject is beyond a designated distance from the touch pad or a case in which a signal notifying of completion of charging is received from the inputting subject.

An electronic device according to various embodiments of the disclosure may determine a subject, which has performed touch input, based on a capacitance variation detected through a touch pad, and may activate a wireless charging function when the subject is determined to be a subject requiring a charging function, thereby preventing the unnecessary consumption of a battery and increasing satisfaction of a user who wants to use a battery sharing function.

Effects obtainable from the disclosure may not be limited to the above mentioned effects, and other effects which are not mentioned may be clearly understood, through the following descriptions, by those skilled in the art to which the disclosure pertains.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments of the disclosure, each component (e.g., a module or a program) of the above-described components may include a single entity or multiple entities. According to certain embodiments of the disclosure, one or more of the above-described components may be omitted, or one or more other components may be added. Alternatively or additionally, a plurality of components (e.g., modules or programs) may be integrated into a single component. In such a case, according to certain embodiments of the disclosure, the integrated component may still perform one or more functions of each of the plurality of components in the same or similar manner as they are performed by a corresponding one of the plurality of components before the integration. According to certain embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device for supporting a wireless charging function, the electronic device comprising:
 a housing;
 a touch pad which is disposed in the housing and comprises an electrode pattern and multiple openings formed on the electrode pattern;
 a wireless charging coil disposed in a layer directly below the touch pad and configured to wirelessly transmit power through the multiple openings formed on the electrode pattern; and
 a processor operationally connected to the touch pad and the wireless charging coil,
 wherein the processor is configured to:
  perform a touch detection function of detecting a touch by an inputting subject by using at least one electrode pattern of the touch pad,
  calculate a capacitance variation of the touch pad while the touch detection function is performed,
  determine whether the inputting subject is an external electronic device that requires a charging function, based on the calculated capacitance variation, and
  in response to determining that the inputting subject is the external electronic device that requires the charging function, perform a charging function of transmitting power by using the wireless charging coil.

2. The electronic device of claim 1, wherein the processor is further configured to:
 determine a subject recognition area having a predetermine range, based on an area in which the touch by the inputting subject has been detected;
 calculate a standard deviation for the determined subject recognition area; and determine whether the inputting subject is the external electronic device that requires a charging function, by using the calculated standard deviation.

3. The electronic device of claim 1, wherein the processor is further configured to perform the touch detection function of activating the touch pad and deactivating the wireless charging coil.

4. The electronic device of claim 1, wherein the processor is further configured to perform the charging function of activating the wireless charging coil and deactivating the touch pad.

5. The electronic device of claim 1, wherein the processor is further configured to transmit, in response to performing the charging function, a designated signal for determining a presence of a wireless power receiving unit and identifying the wireless power receiving unit.

6. The electronic device of claim 5, wherein the processor is further configured to stop performing the charging function when the presence of the wireless power receiving unit is not determined or when the wireless power receiving unit is not identified.

7. The electronic device of claim 5, wherein the processor is further configured to:
monitor a state of the external electronic device while the charging function is performed, and
stop performing the charging function when the state of the external electronic device satisfies a designated condition.

8. The electronic device of claim 7, wherein the designated condition comprises at least one of a case in which the external electronic device is beyond a designated distance from the touch pad or a case in which a signal notifying of completion of charging is received from the external electronic device.

9. The electronic device of claim 1, wherein the touch pad comprises:
a first sensor layer which comprises a first electrode pattern and multiple first openings formed on the first electrode pattern; and
a second sensor layer which is disposed beneath the first sensor layer and comprises a second electrode pattern and multiple second openings formed on the second electrode pattern.

10. The electronic device of claim 9, wherein the touch pad further comprises a ground layer which is disposed beneath the second sensor layer and is configured to be aligned with the first electrode pattern or the second electrode pattern.

11. The electronic device of claim 10,
wherein the ground layer comprises at least one third opening, and
wherein the wireless charging coil wirelessly transmits power through the multiple first openings, the multiple second openings, and the at least one third opening.

12. The electronic device of claim 11, wherein a position of the at least one third opening corresponds to at least one of positions of the multiple first openings or positions of the multiple second openings.

13. A method of an electronic device, which comprises a wireless charging coil disposed in a layer directly below a touch pad that includes an electrode pattern and multiple openings formed on the electrode pattern, the method comprising:
performing a touch detection function of detecting a touch by an inputting subject by using at least one electrode pattern of the touch pad;
calculating a capacitance variation of the touch pad while the touch detection function is performed;
determining whether the inputting subject is an external electronic device that requires a charging function, based on the calculated capacitance variation; and
in response to determining that the inputting subject is the external electronic device that requires the charging function, performing a charging function of wirelessly transmitting power through the multiple openings by using the wireless charging coil.

14. The method of claim 13, wherein the calculating of the capacitance variation comprises:
determining a subject recognition area having a predetermined range, based on an area in which the touch by the inputting subject has been detected; and
calculating a standard deviation for the determined subject recognition area.

15. The method of claim 13, wherein the performing of the touch detection function comprises activating the touch pad and deactivating the wireless charging coil.

16. The method of claim 13, wherein the performing of the charging function comprises activating the wireless charging coil and deactivating the touch pad.

17. The method of claim 13, wherein the performing of the charging function comprises transmitting a designated signal for determining a presence of a wireless power receiving unit and identifying the wireless power receiving unit.

18. The method of claim 17, wherein the performing of the charging function comprises stopping performing the charging function when the presence of the wireless power receiving unit is not determined or when the wireless power receiving unit is not identified.

19. The method of claim 17, wherein the performing of the charging function comprises:
monitoring a state of the external electronic device while the charging function is performed; and
stopping performing the charging function when the state of the external electronic device satisfies a designated condition.

20. The method of claim 19, wherein the designated condition comprises at least one of a case in which the inputting subject is beyond a designated distance from the touch pad or a case in which a signal notifying of completion of charging is received from the inputting subject.

* * * * *